Figure 1:
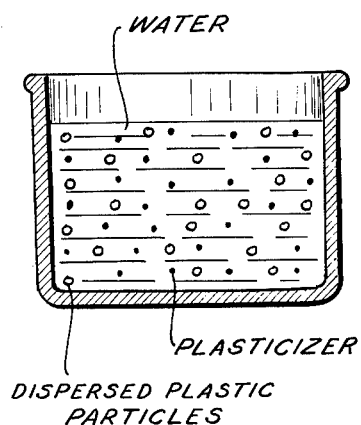

Oct. 26, 1965            J. GÖBEL            3,214,402

HEAT-SEAL ADHESIVE COMPOSITIONS AND METHODS OF MAKING SAME

Filed Sept. 13, 1962

INVENTOR.
JOHANNES GÖBEL
BY
Att'y

United States Patent Office 3,214,402
Patented Oct. 26, 1965

3,214,402
HEAT-SEAL ADHESIVE COMPOSITIONS AND
METHODS OF MAKING SAME
Johannes Göbel, Aschaffenburg am Main, Germany, assignor to Buntpapierfabrik A.G., Aschaffenburg am Main, Germany
Filed Sept. 13, 1962, Ser. No. 223,402
Claims priority, application Germany, Dec. 23, 1961, B 65,320
5 Claims. (Cl. 260—30.8)

This invention relates to adhesive compositions, and more particularly to heat-seal adhesive compositions for use on paper, foils and other bases, and methods of making such compositions.

In the manufacture of paper labels, stickers, or the like, it is well known to apply to the paper heat-seal adhesive compositions which have delayed heat-seal characteristics. With these papers the adhesive compositions remain adhesive for some time after they have been heat activated, e.g., by heating to 110° C., and seal only gradually on cooling. Compositions of this type can be applied to bases other than paper, such as foils or textiles, or on surface coated paper provided on one side with a chromo-, gloss-, glaze- or high glaze-finish, or a bronze or plastic coating, while the adhesive composition is applied to the other side of the paper.

Up to now, heat-seal adhesive compositions having a delayed adhesive effect, were usually prepared from polymeric esters of acrylic, methacrylic or crotonic acid, or from polyvinyl esters (in accordance with German Patent 930,941), or from mixtures of indene resins and ethyl celulose (according to U.S.P. 624,620). and this invariably in mixture with a solid plasticizer. Suitable polymers were, for example, the alkyl esters and especially the lower alkyl esters of the acids enumerated above, such as polyethylacrylate or polyvinylpropionate, while the solid plasticizer was any one of a number of compounds known to be suitable for this purpose, such as solid phthalic esters and particularly diphenylphthalate, N-alkylated toluene sulfonic acid amides, p-toluene sulfonic acid alkyl esters such as the ethyl ester, etc.

The process of producing effective heat-seal compositions having delayed adhesive properties essentially comprises introducing in the finest possible state of subdivision, the solid plasticizers having a particle size from 0.5 to 30µ, by means of suitable devices such as hopper mills or homogenizers, either into solutions, or else dispersions of the above-noted synthetic materials. In order to yield compositions which on application on a base such as paper, do not stick, i.e., do not cause the coated bases when stapled on top of one another to adhere to each other at room temperature, the solid plasticizers must be present in the compositions in an undissolved, possibly crystalline form. There must be no adhesive effect except on heating of the coated base material, this heating being also referred to as "activation."

In the case of solutions, most of the solid plasticizers suitable for use in such compositions and available on the market, however, have in common the disadvantage that they, too, are soluble in the diverse organic solvents which are used to prepare solutions of the synthetic materials or plastics, and thus would not result in adhesive compositions wherein the plasticizers are present in an undissolved state.

A number of commercially available plasticizers were tested for solubility in the following solvents: ethyl acetate, methylene chloride, ethyl glycol, ethyl alcohol, and xylene, and it was found that all plasticizers tested were readily soluble in these solvents:

Plasticizer W 82 (diphenyl phthalate)
Plasticizer W 98 (dicyclohexyl phthalate)
Plasticizer BA/1 (a 70% chlorinated paraffin)
Plasticizer BA/2 (pure, twice distilled polyethylene glycol of molecular weight 4000–5000):
    N-cyclohexyl-p-toluene-sulfonamide
    triphenyl phosphate
    dimethyl diphenyl urea
    diethyl diphenyl urea.

This solubility of the solid plasticizers causes the adhesive compositions incorporating the same, on application on a base, to exhibit adhesive properties even before any activation has taken place, with the result that stapled, superposed sheets of coated base material stick to one another. Manifestly, no satisfactory, non-sticky composition suitable for application on a base, is obtainable by this process.

The second of the above-mentioned conventional methods of preparing these compositions comprises most intimately mixing the very finely subdivided plasticizer with an aqueous dispersion of the plastic, and applying the composition thus obtained on a base. Once the coating has dried, a composition results which at room temperature is non-adhesive and hence, has no sticky property, and which is rendered adhesive only on heating, e.g., to 100° C. This non-sticky characteristic of the adhesive composition is due to the use of water insoluble plasticizers. Individual particles of the water insoluble plasticizer are disposed in the adhesive compositions, even after drying, adjacent to individual plastic particles and are dissolved neither by the plastic particles nor by the solvent or dispersing agent, in contrast to their dissolution by the organic solvents employed as solvents for the plastic in the first method discussed above.

For many purposes it is desirable, however, to prepare adhesive compositions from plastic solutions in organic solvents rather than from aqueous plastic dispersions as certain bases to be coated, such as glassine or imitation parchment, or glazed papers, are extremely sensitive to water and on being coated with an aqueous dispersion, become undulated so no smooth coat can be applied. Also, aqueous dispersions reduce the brilliancy of bright enamel chromo papers, and glazed papers.

It is a primary object of the present invention to meet the demand for a process wherein the finely subdivided solid plasticizer can be incorporated in plastic solutions on the basis of organic solvents wherein the plasticizers, too, are normally soluble.

It is a correlated object of this invention to provide heat-seal adhesive compositions which exhibit neither sticky properties prior to heat activation, nor an undulating effect on the carrier base, nor a reduction of the gloss of glazed or similar brilliant finish papers.

It is a further object of the invention to provide novel heat-sealing adhesive compositions, which can also be applied to plastic foils, e.g., such made from PVC or Polystyrol and which adhere easily to these foils, unlike aqueous dispersions which tend to pearl off these plastic foils, and thus, would not permit to obtain a uniform and close coating.

The new heat-sealing compositions, prepared by using organic solvents, therefore, also represent an essential technical progress in the coating of plastic foils.

A further object of the invention is to provide novel heat-sealing adhesive compositions, and a novel method of preparing the same, which while free from the drawbacks besetting conventional compositions and processes, lend themselves to economic, commercial manufacture.

Other objects, and the manner in which the same are attained, will become apparent as this specification proceeds.

Seen in its broader aspects, the invention comprises coating the plasticizer particles prior to their introduction into the plastic solution, with a material which in most organic solvents for plastics, contemplated for present purposes, is either insoluble or hardly soluble. For the purpose of coating or embedding the plasticizer particles, carboxy groups containing polyvinyl compounds and their salts, and particularly those salts which are soluble in alcohol or water, have been found eminently suitable. Typical examples of such materials are the alcohol or water soluble salts of polymethacrylic acid, polyacrylic acid, crotonic acid, maleic acid, as well as their copolymers with polyacrylic esters and polymethacrylic esters; polyvinyl chloride, polyvinylidene chloride, polyvinyl acetates, polyvinylacrylic ether and polystyrene.

In the preparation of the novel adhesive compositions, solutions of the substances exemplified above in alcohols such as ethanol or methoxy butanol, or in alcohol-water mixtures are prepared, whereupon the most finely ground solid plasticizer is introduced in the solution. The mixtures thus obtained are then dispersed in the solutions of plastics or similar synthetic materials to be employed, suitable solvents for the plastics being esters, ethers, or aromatic or aliphatic hydrocarbons. Among the plastics contemplated for purposes of the invention are polymeric esters of acrylic, methacrylic or crotonic acid, or polyvinyl esters, and mixtures of indene resins and ethyl cellulose.

The solid plasticizer may be one of those noted above, i.e., for example a solid phthalic ester, and particularly diphenyl phthalate, dicyclohexyl phthalate, N-alkylated toluene sulfonic acid amide, p-toluene sulfonic acid alkyl ester, acetamide, benzophenone, diphenyl carbinol, dimethyl diphenyl urea, etc.

In the drawing attached to the present application and forming part thereof, the invention is illustrated diagrammatically by comparison with a prior art product.

Figure 2:
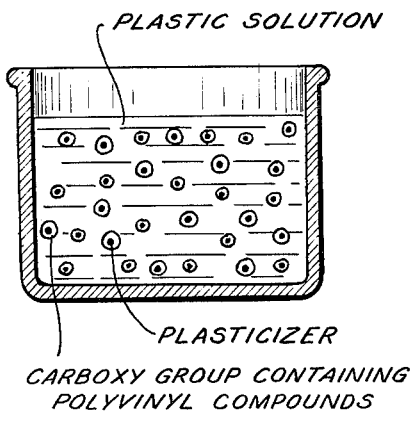

In the drawing,

FIG. 1 illustrates the product obtained from the prior art process using an aqueous plastic dispersion, while FIG. 2 shows the present product resulting from the incorporation of pre-coated plasticizer particles in a plastic solution.

Referring to the drawing and first to FIG. 1, this shows plastic particles and particles of solid plasticizer, discretely disposed or dispersed in water.

According to FIG. 2, however, the particles of solid plasticizer are embedded in or coated with a shell of carboxy group containing polyvinyl compounds, the thus coated particles being dispersed in a solution of the plastic.

The novel process of the present invention is particularly useful when used in the preparation of heat-seal adhesive compositions from solutions of thermoplastic materials in which the solid plasticizers are normally soluble.

The dispersions of solid plasticizers embedded in carboxy group containing polyvinyl compounds, in solution of thermoplastic material, prepared according to the invention, are applied on a carrier base such as a plastic, textile or paper, by means of a doctor or roller, or by pouring, in a known manner, yielding a coating which when dry has a weight from about 10 to about 40 grams per square meter, and which is non-sticky and non-adhesive at temperatures below 40° C. and higher temperatures. Only when heated to temperatures from about 80 to 150° C. this coating is rendered adhesive, thus permitting the coated material to be pasted on objects made of paper, wood, glass, metal or plastics. For this purpose, the coated material is cut into labels, stickers, cut-outs, etc., of any shape desired which may be printed on, either on the coated side or on the opposite side, by any of the known printing methods, such as offset, typography, intaglio or aniline printing. The labels of similar cuts thus prepared are free from any undulation and are distinguished by an excellent evenness of surface and uniformity of size, properties which are of the utmost importance for printing purposes.

The present process permits the use of bases which when coated with heat-sealing adhesive compositions on the basis of aqueous dispersions, were disqualified by undulation, and also is susceptible of use on bright enamel, or high gloss, papers which when coated with an aqueous dispersion, lost their luster.

When heated or activated, the present heat-seal adhesive compositions retain their adhesiveness for a time which, dependent on their specific composition, may vary between some hours so that the transfer or application of the labels to whatever object they are to be pasted on, is not tied to the activation process but may follow the same after an interval.

The invention is illustrated by the following examples, which, however, must be understood as having an explanatory and illustrative, rather than a limitative character.

*Example 1*

30 kg. of dicyclohexyl phthalate, a solid plasticizer, are very finely ground and mixed with 30 kg. of "Acrytex W2," a 20% aqueous solution of low molecular sulfo group containing polyacrylic acid. The mixture thus obtained is introduced and dispersed, in an agitator, into 50 kg. of "Acronal 500 L," a 40% ethyl acetate solution of a highly viscous copolymer of an acrylic acid ester. A spreadable mixture results which by means of a doctor mechanism, is applied to a coated bright enamel or high gloss paper of the "Kromekote" type having a weight of 90 grams per square meter. The weight of the adhesive composition applied to the paper amounted to 30 grams per square meter.

*Example 2*

30 kg. of "Disflamoll TP," a solid plasticizer consisting of triphenyl phosphate, are most finely comminuted and well mixed, in an emulsifier, with 10 kg. of "Rohagit S3," in a 10% solution in ethanol plus water 1:1, with a pH value of 7.2 obtained by addition of caustic soda; Rohagit S3 is a carboxy group containing copolymer with acid esters having from 1 to 4 C atoms on an acrylate basis, with a molecular weight of about 200,000. 20 kg. of "Polystyrene B," a copolymer of styrene—and acrylic acid-ester having a K-value of about 50, an acid number of 0, a color number (50% in toluene) of substantially 0, a density $d\ 20°/4''$ of 1.06–1.08, and a refraction number $N_D 20°$ of about 1.559 are dissolved in 40 kg. of xylene. The mixture prepared in the emulsifier is stirred, by means of an agitator, into the polystyrene solution to be most finely distributed throughout the same.

The adhesive composition thus obtained is applied by means of rollers, to sheets of 100 g. high gloss chromo paper; when dry the coating weighs 30 grams per square meter. Paper thus coated is cut into labels or similar cuts, with outstanding characteristics.

*Example 3*

30 kg. of "Weichmacher 98," a solid plasticizer consisting of dicyclohexyl phthalate, is reduced to a very fine powder and in a suitable mixer, mixed with 10 kg. of "Mowilith Ct 5A" in a 50% alcohol solution, this product being a crotonic acid containing polyvinyl acetate copolymer. The resulting paste-like mixture is introduced under stirring, in a 50% solution in gasoline, of 50 kg. of "Plexigum P26," a poly-isobutylmethacrylate with a molecular weight of 50,000 to 100,000, and stirring is continued until a very fine distribution and consequently, a completely homogenous mixture is obtained. This mixture is poured on a sheet of 50 g. imitation parchment paper; the quantity of adhesive composition thus applied amounted to 20 grams per square meter.

*Example 4*

50 kg. of "Santicyzer 1H," a solid plasticizer consisting of n-cyclohexyl s-toluene sulphonamide, is pulverized and mixed in an agitator, with 25 kg. of "Plexigum 7538," in a 20% solution in a 1:1 mixture of alcohol and water with a 1% addition of ammonia, Plexigum 7538 being a carboxy group containing polyethylacrylate with molecular weight of 20,000 to 40,000. The resulting paste is stirred into 50 kg. of "Vinnapas BP 50E," a 50% solution of polyvinyl acetate in ethyl acetate, and stirring is continued until a very fine dispersion is obtained. The resulting spreadable composition is applied by means of a screen printer, to aluminum foil of a thickness of $10\mu$ backed with cellulose paper weighing 40 grams per square meter, the adhesive composition being applied on the paper side. The quantity of adhesive composition applied when dry, amounts to 25 grams per square meter. The aluminum foil thus treated is cut into labels having excellent properties.

*Example 5*

30 kg. of dicyclohexyl phthalate, a solid plasticizer, is most finely pulverized and introduced in 7.8 kg. of "Vinnapas T1041" dissolved in 11 kg. of ethyl alcohol and 11 kg. of water, with an addition of 0.5 kg. of ammonia; Vinnapas T1041 is a crotonic acid containing polyvinyl acetate copolymer. The paste-like mixture obtained is introduced under stirring, in a 40% solution in gasoline, of 20 kg. of "Plexigum P26. To this mixture are added 12 kg. of "Plexisol D592" solution, a 60% solution in gasoline of a butylacrylate, and 4 kg. of "Lutonal A50," a 70% solution in toluene, of a highly viscous polyvinyl ethyl ether and the resulting mixture is thoroughly treated in a homogenizer. The spreadable mass thus obtained is applied by means of a doctor, to a cellulose paper weighing 60 g. and provided with a surface finish, the quantity of adhesive coating applied corresponding to 30 grams per square meter. The coated paper was dried in a drying channel.

*Example 6*

50 kg. of "Santicyzer 1H," is pulverized and mixed in an agitator, with 25 kg. of "Plexigum 7538," in a 20% solution in a 1:1 mixture of alcohol and water with a 1% addition of ammonia. The resulting paste is stirred into 50 kg. of "Vinnapas BPE 50E," and stirring is continued until a very fine dispersion is obtained. The resulting spreadable composition is applied by means of a screen printer, to a PVC-foil of a thickness of $30\mu$. The quantity of adhesive composition applied when dry, amounts to 25 grams per square meter. The PVC-foil thus treated is cut into labels having excellent properties. The compositions prepared according to Examples 1 to 6, inclusive, and comprising solid plasticizers embedded in carboxy group containing polyvinyl compounds and incorporated in organic solutions of plastic material, once they are applied on the base, are dried in a drying channel at a temperature not exceeding 30° C. whereby the solvents evaporate. The adhesive compositions according to the above examples are activated at temperatures of about from 100 to 150° C., i.e., they are heated, e.g., on a heater plate, or under a source of infrared radiation, or by a current of hot air, to be rendered adhesive, and they are pasted immediately while still adhesive, on the objects to which they are to be applied.

It should be understood that I do not desire to be limited to the details of process or composition referred to in this specification to facilitate an understanding of the invention, as modifications within the scope of the appended claims and involving no departure from the spirit of the invention, nor any sacrifice of the advantages thereof, may occur to workers in this field.

I claim:

1. A method of making heat-sealing adhesive compositions having delayed heat-seal characteristics and particularly adapted for coating foils, paper, textiles and the like, from thermoplastic materials and solid plasticizers which, when molten, are compatible with said thermoplastic materials, comprising the steps of:
  (a) selecting a finely comminuted solid plasticizer with a particle size between 0.5 and $30\mu$ and a melting point between 40 and 100° C. selected from the class consisting of diphenyl phthalate, dicyclohexyl phthalate, N-cyclohexyl toluene sulfonic acid amid, p-toluene sulfonic acid alkyl ester, acetamide, benzophenone, diphenyl carbinol and dimethyl diphenyl urea;
  (b) coating said solid finely divided plasticizer with polymeric ester made from an aliphatic alcohol having 1 to 4 carbon atoms and an acid selected from the class consisting of methacrylic acid, crotonic acid and maleic acid; and
  (c) dispersing the plasticizer thus coated in a nonaqueous, non-alcoholic, organic solvent solution in admixture with a thermoplastic resin selected from the class consisting of lower esters of polyacrylic and polymethacrylic acid and ethyl cellulose, said organic solvents selected from the class consisting of esters, ethers, aliphatic hydrocarbons and aromatic hydrocarbons which are solvents for the thermoplastic materials, being non-solvents for the carboxy group containing coating agent.

2. A method according to claim 1, wherein the material used in coating the plasticizer is selected from the class consisting of water and alcohol soluble salts of polymethacrylic acid, polyacrylic acid, crotonic acid, maleic acid, their copolymers with polyacrylic and polymethacrylic esters of aliphatic alcohols having 1 to 4 carbon atoms, polyvinyl chloride, polyvinylidene chloride, polyvinyl acetate, polyvinylacrylic ether and polystyrene.

3. A method according to claim 1, wherein the amount of plasticizer dispersed in the solution of thermoplastic material, may vary from 20 to 200 percent calculated on the weight of said thermoplastic material.

4. As a new product, a heat-seal adhesive composition prepared by the method according to claim 1.

5. As a new product, a heat-seal adhesive composition prepared by the method according to claim 2.

References Cited by the Examiner

UNITED STATES PATENTS 2,853,404  9/58  Weinberg _____ 117—122

FOREIGN PATENTS 638,436  3/62  Canada.

MORRIS LIEBMAN, *Primary Examiner.*